United States Patent [19]

Huffman et al.

[11] 3,711,750

[45] Jan. 16, 1973

[54] DYNAMIC ANHYSTERETIC DEMAGNETIZATION APPARATUS HAVING POLE FACES PERPENDICULAR TO THE ROTATIONAL AXIS

[75] Inventors: Russell B. Huffman; Stuart J. Baker; Donald P. Grosslight, all of Northridge; Aldren M. Pace, Reseda, all of Calif.

[73] Assignees: Huffman and Baker; Grosslight and Pace, ; part interest to each

[22] Filed: July 2, 1969

[21] Appl. No.: 838,530

[52] U.S. Cl. ..........................317/157.5, 179/100.2 D

[51] Int. Cl. ............................G11b 5/02, H01f 13/00

[58] Field of Search ............179/100.2 D; 317/157.5, 157.51; 335/284

[56] References Cited

UNITED STATES PATENTS

| | | | |
|---|---|---|---|
| 3,351,717 | 11/1967 | Metz | 179/100.2 D |
| 3,126,502 | 3/1964 | St. Denis | 335/284 |
| 2,766,328 | 10/1956 | Handschin et al. | 317/157.5 |
| 2,848,660 | 8/1958 | Boyers | 317/157.5 |
| 3,156,784 | 11/1964 | Kump | 179/100.2 D |
| 3,191,102 | 6/1965 | Lambeir et al. | 317/157.5 |

*Primary Examiner*—James W. Moffitt
*Assistant Examiner*—Alfred H. Eddleman
*Attorney*—Clarence A. O'Brien and Harvey B. Jacobson

[57] ABSTRACT

A magnetic tape with recorded data thereon is demagnetized and/or erased by being passed through an erasure zone having rotating magnetic fields. The magnetic fields have an intensity sufficient to saturate the recording medium and remain within the negative region of the hysteresis curve while remanent magnetism is removed.

5 Claims, 8 Drawing Figures

Russell B. Huffman
Stuart J. Baker
Donald P. Grosslight
Aldren M. Pace INVENTORS BY Clarence A. O'Brien
and Harvey B. Jacobson
Attorneys Russell B. Huffman
Stuart J. Baker
Donald P. Grosslight
Aldren M. Pace
INVENTORS BY Clarence A. O'Brien
and Harvey B. Jacobson
Attorneys

DYNAMIC ANHYSTERETIC DEMAGNETIZATION APPARATUS HAVING POLE FACES PERPENDICULAR TO THE ROTATIONAL AXIS

This invention relates to the erasure of magnetic recordings from recording media such as magnetic tape and more particularly to a method and apparatus for demagnetizing and/or erasing magnetic recording media.

Most magnetic erasing apparatus for reels of magnetic tape utilize a stationary, alternating magnetic field having a maximum tape saturating field intensity generated by an a.c. field transformer. With this type of demagnetizing apparatus, the ferro-magnetic fields of the single domain particles within the ferro-magnetic matrix of the magnetically coated surface of the tape, are randomly orientated and because of the hysterisis affect, a remnant magnetization remains after erasure. Generally this remnant magnetism occurs because the magnetic tape is magnetized in accordance with an ideal anhysteretic principle whereby a constant direct current field is applied to the ferromagnetic particles simultaneously with an alternating current which is gradually reduced to zero as the tape is withdrawn from the magnetizing zone. The remnant magnetization is estimated to be proportional to the applied direct current voltage.

In accordance with the present invention, the aforementioned remnant magnetism is removed when neutralizing any magnetic recording on magnetic tape or other media by subjecting the tape to a rotating, magnetic field of high intensity that reverses in polarity with respect to an adjacent erasing zone. At the same time, the tape is withdrawn from the magnetic field in the erasing zone at a predetermined linear speed which is a function of the rotational speed of the magnetic field so that all of the ferro-magnetic particles passing through the erasure zone that were in the positive region of the hysterisis curve, will pass into the negative region so that no remnant magnetization remains. The principle of anhysteretic magnetization is thereby applied in a unique manner to the demagnetization of magnetic recording media.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 3, 4, 8:
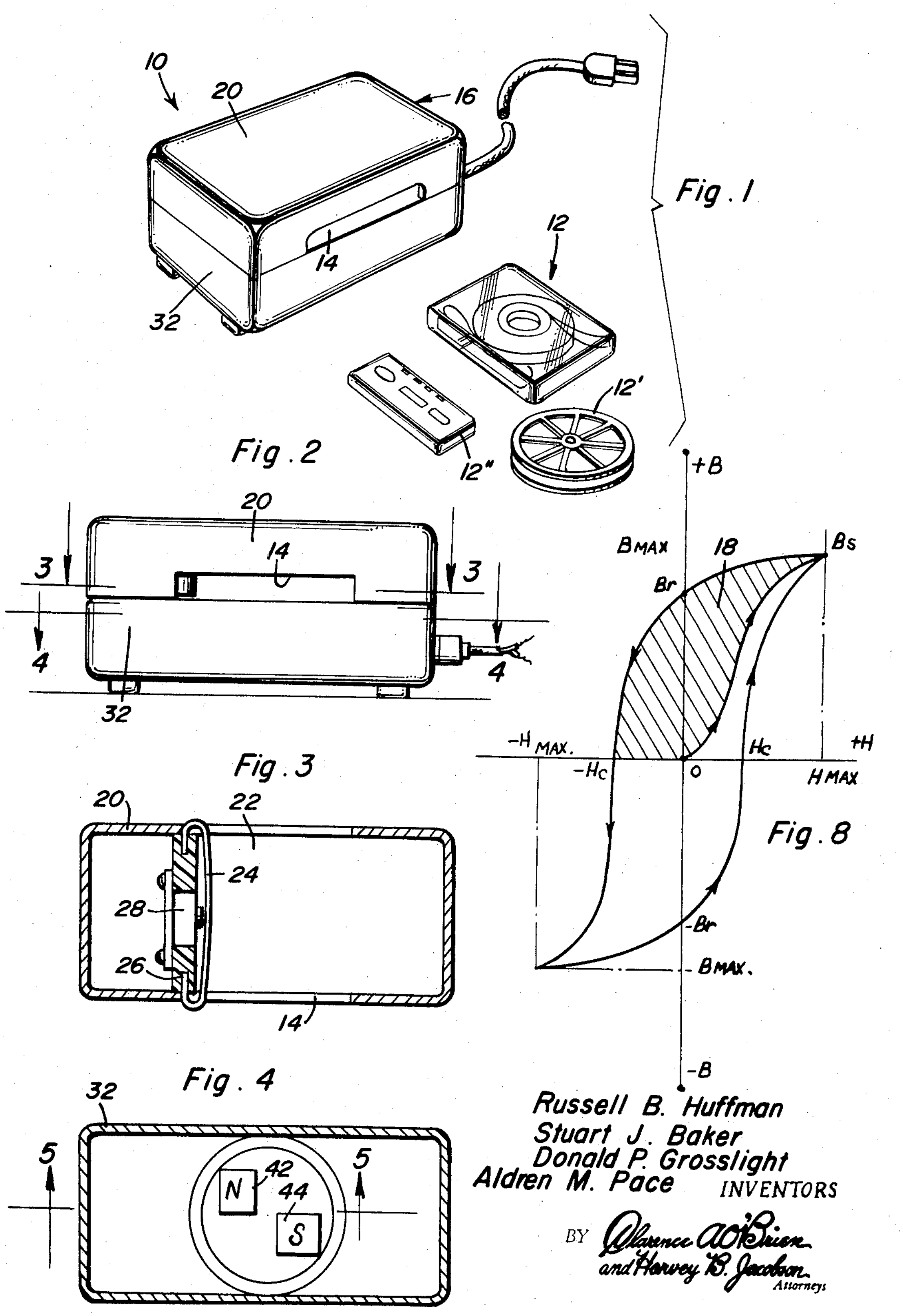
FIG. 1 is a perspective view illustrating one exemplary embodiment of apparatus constructed in accordance with the present invention in order to carry out the principles thereof.
FIG. 2 is a front elevational view of the apparatus shown in FIG. 1.
FIG. 3 is a top sectional view taken substantially through a plane indicated by section line 3—3 in FIG. 2.
FIG. 4 is a top sectional view taken substantially through a plane indicated by section line 4—4 in FIG. 2.

Referring now to the drawings in detail, FIG. 1 illustrates one form of magnetic erasing apparatus generally denoted by reference numeral 10 adapted to receive a holder of magnetic tape in cartridge, reel or cassette form respectively denoted by reference numerals 12, 12′ and 12″. The tape holders which are presently commercially available items may be inserted from either side through a slot 14 formed in the housing 16 of the demagnetization apparatus so that the tape may be demagnetized as it is passed through the erasure zone within the apparatus. Thus, the apparatus 10 may be designed to effect erasure of recorded messages, signals, etc. on the tape within the tape holder as it is passed through.

FIG. 8 illustrates a hysteresis curve characterizing the magnetization of the ferro-magnetic particles within the magnetic coating on magnetic tape. This hysteresis curve, graphically illustrates the lag in the magnetization forces of the ferro-magnetic particles from the magnetizing field due to the resistance of the material and the frequency of the magnetic field of present apparatus where a stationary, alternating magnetic field is utilized. In accordance with the ideal anhysteretic magnetization principle, magnetic tape is magnetized and thereby also prepared for demagnetization by simultaneously applying a constant direct current field through the magnetizing head and an alternating current field. The alternating current field is gradually reduced to zero as the tape moves through the magnetizing zone resulting in a remnant magnetism which is proportional to the applied direct current voltage. This principle is utilized for demagnetization purposes in accordance with the present invention in order to substantially remove the remnant magnetism which occurs because of the hysteresis action within the remnant magnetization zone 18 as depicted in the graph of FIG. 8.

The foregoing object of the present invention is achieved by use of a magnetic field within the erasure zone that is in motion and more particularly rotating at a constant speed selected in accordance with the linear reel transport speed of the tape being passed through the erasure zone so that all ferro-magnetic particles in the tape coating within the positive region of the hysteresis curve will pass into the negative region of the curve.

Figure 5:
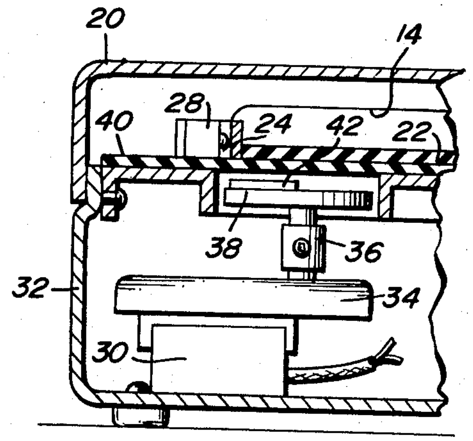
FIG. 5 is an enlarged partial sectional view taken substantially through a plane indicated by section line 5—5 in FIG. 4.

In the illustrated embodiment of the invention as more particularly seen in FIGS. 3, 4 and 5, the erasure zone is established within the removable cover portion 20 of the housing 16 above a plate 22 made of insulative material. The slot 14 in the cover communicates with the erasure zone so that the tape holder may be inserted therein. When inserted, the holder presses against a spring element 24 anchored by the blocks 26 so as to actuate a microswitch 28 controlling the energization of a suitable electric motor 30 fixedly mounted within the base portion 32 of the housing.

Figures 6, 7:
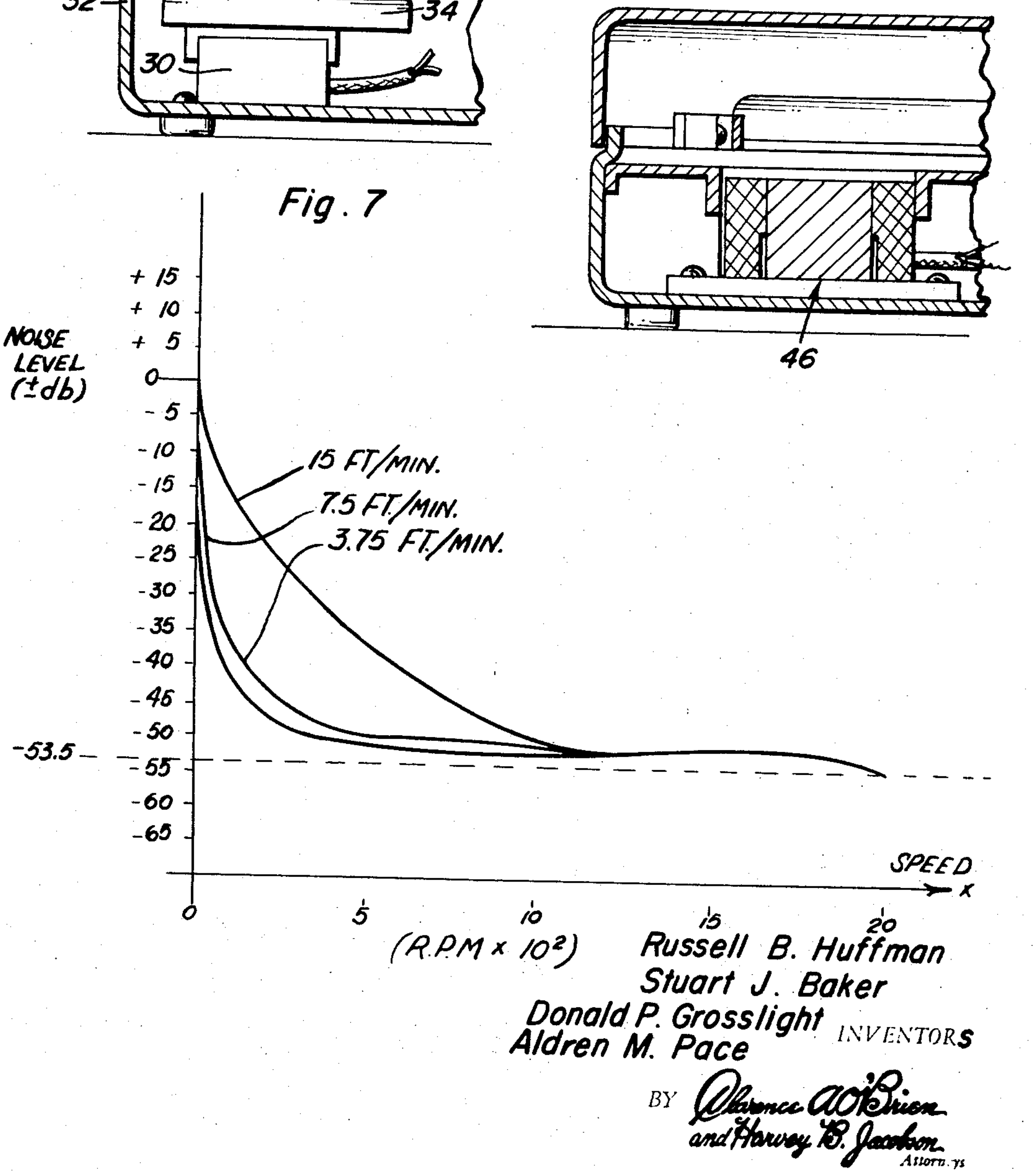
FIG. 6 is a partial sectional view showing another embodiment of the invention.
FIG. 7 is a graphical illustration of certain relationships associated with the method of the present invention.

The motor 30 is drivingly connected through a gear reduction assembly 34 and coupling 36 to a rotor plate 38 which is generally parallel to and closely spaced below the plate 40 underlying the plate 22 above which the erasure zone is established. The rotor plate 38 is circular as shown in FIG. 4. At least two permanent magnets 42 and 44 of the high intensity ceramic type are mounted on top of plate 38. The magnets are angularly spaced from each other by equal amounts or 180° in this case, and present pole faces of opposite polarity from which flux of a relatively high intensity is emitted generally parallel to the rotational axis of the rotor 38. Upon closing of the switch 28 when the tape holder is positioned within the erasure zone, the magnets 42 and 44 are rotated about the rotational axis of the rotor at a constant speed to thereby produce a demagnetizing affect corresponding to magnetization in accordance with the ideal anhysteretic principle aforementioned. Toward this end, the rotational speed of the magnetic field must be correlated to the linear speed of the tape passed through the erasure zone in accordance with relationships that may be empirically determined as graphically depicted for example by the curves in FIG. 7. Thus, the curves in FIG. 7 depict the relationship of linear tape transfer speed and rotation of the magnetic field within the erasure zone insofar as noise level is concerned representing the amount of remnant magnetization within the magnetic tape after being demagnetized in accordance with the present invention. This noise level varies between a threshold level of −53.5 for the playback amplifier and zero as the curves approach the vertical axis asymptotically. The relationship depicted by the curves is independent of the magnetic material, surface area, configuration and spacing. The family of curves shown in FIG. 7 are obtained by use of a rotor mounting two pole magnets in order to generate the rotating magnetic field. By increasing the number of poles, the rotational speed of the rotor may be decreased since the same rotational frequency must be employed in connection with the rotating magnetic field. For this purpose, the formula: $rpm = F \times 120/N$ is utilized where $F$ equals the frequency and $N$ equals the number of poles.

The magnetic field may be electrically rotated instead of being mechanically rotated as illustrated in FIGS. 4 and 5. Thus, FIG. 6 illustrates a modified form of apparatus in which the motor drive and rotor are replaced by an electromagnetic coil assembly generally referred to by reference numeral 46 through which a rotating magnetic field is generated in accordance with well known principles.

It should also be appreciated, that the magnetic erasing apparatus of the present invention may be modified and adapted to different types of tape recorders and to receive different types of tape storing reels. When built to utilize a tape recorder drive spindle, the rotor may be driven from the reel drive of the tape recorder replacing the motor 30 hereinbefore described. Further, where a mechanical drive for rotating the magnetic field within the erase zone is employed, high intensity magnetic fields must be utilized. Rotation of these fields may be effected by either power from an external source or self-contained batteries. Also, the tape holder may be passed through the erasure zone either manually or by power operated means such as an endless belt drive.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for demagnetizing a magnetic recording medium comprising means for generating a rotating magnetic field within an erasure zone having a flux density of saturating value, and means for guiding movement of the recording medium through the erasure zone to remove remnant magnetism while magnetically neutralizing the recording medium, said field generating means including at least two flux emitting pole faces of opposite polarity orientated in a plane perpendicular to a rotational axis about which the magnetic field is rotated, and means for cyclically reversing the positions of said pole faces relative to said axis to induce an a.c. electric field in the recording medium removing the remnant magnetism resulting from magnetic hysteresis.

2. The combination of claim 1 wherein said means for generating the magnetic field further includes an electromagnetic coil assembly, and energizing means connected to the coil assembly for establishing an electrically rotated magnetic field.

3. The combination of claim 1 wherein said field generating means further includes a rotor on which said pole faces are mounted, said cyclic reversing means including motor means drivingly connected to the rotor for rotation thereof about the rotational axis of the magnetic field.

4. Apparatus for demagnetizing a magnetic recording medium comprising means for generating a rotating magnetic field within an erasure zone having a flux density of saturating value, and means for moving the recording medium through the erasure zone at a speed which is a predetermined function of the rotational speed of the rotating magnetic field to remove remnant magnetism while magnetically neutralizing the recording medium, said means for generating the magnetic field including a rotor rotatable about an axis extending through said erasure zone perpendicular to linear movement of the recording medium, at least two magnets fixedly mounted on the rotor having pole faces of opposite polarity from which flux is emitted generally parallel to said axis and motor means for imparting rotation to the rotor at a constant speed.

5. The combination of claim 4 wherein said motor means includes a motor drivingly connected to the rotor and switch means responsive to positioning of the recording medium within the erasure zone for energizing the motor.

* * * * *